UNITED STATES PATENT OFFICE.

FRANK S. WASHBURN, OF NASHVILLE, TENNESSEE.

FERTILIZER CONTAINING LIME NITROGEN AND TANKAGE MATERIAL.

1,135,639.     Specification of Letters Patent.    Patented Apr. 13, 1915.

No Drawing.     Application filed November 17, 1914. Serial No. 872,627.

*To all whom it may concern:*

Be it known that I, FRANK S. WASHBURN, a citizen of the United States, residing at Nashville, in the county of Davison and State of Tennessee, have invented certain new and useful Improvements in Fertilizer Containing Lime Nitrogen and Tankage Material; and I do hereby declare the following to be a full, clear, and exact description of the invention, such as will enable others skilled in the art to which it appertains to make and use the same.

This invention relates to a process of treating low grade tankages and similar fertilizing materials with commercial calcium cyanamid, commonly known as cyanamid, and has for its object the production of an improved product which shall be drier than the ordinary tankage, richer in nitrogen and shows a higher nitrogen availability than the original tankage. It will also be free from the disadvantages of mixing the raw material with other fertilizer materials and at the same time will facilitate the distribution of cyanamid upon the soil.

To these ends the invention consists in the novel steps constituting my process as well as in an improved resulting product, all of which will be more fully hereinafter disclosed and particularly pointed out in the claims.

In order that the object of my invention may be more fully emphasized I might say that I propose to eliminate the following objections which exist in the manufacture and application of low grade tankage for fertilizer purposes; the drying of low grade tankage is costly and tedious, for in general it is produced from animal and vegetable waste organic materials, which are of a moist and sticky consistency. It is sometimes found necessary to add to certain classes of these materials in the course of manufacture sulfuric acid, and to others a long continued cooking operation. This usually leaves them with about 25% and upward of moisture, and as the most common drying method is to subject them to the action of a direct heat drier, it is rather difficult to reduce the moisture content below 15 to 25% in such a direct fired drier, because of the liability of the material either to lose ammonia through over-heating or to take fire because it becomes irregularly dried in spots and the dried material is quite inflammable. As a result these materials often appear on the market containing as much as 20% moisture, which makes them very difficult to handle in the fertilizer industry. It is sometimes found advisable to reduce the moisture content to 15 to 20% in the direct fired drier, and then spread the materials on a large floor where they are subjected to atmospheric drying for a period of from six to eight weeks in order to reduce their moisture content down to such limits that they can be conveniently used in fertilizer compounding. Such low grade tankages can be divided into the two classes: animal and vegetable. The low grade animal tankage contains in each 100 pounds a nitrogen content equivalent to from 6 to 8 pounds of ammonia, and a phosphorus content equivalent to 10 to 6 pounds of phosphoric acid. The vegetable tankage commonly known as garbage tankage, contains in each hundred parts nitrogen equivalent to 2—2 parts of ammonia. We, therefore, see that the nitrogen content of these materials is very low. Manufacturers and agriculturists prefer materials with a much higher nitrogen content.

The nitrogen content in the tankages does not show a particularly high availability as decided by the ordinary chemical methods, this availability averaging from 20 to 50% for garbage tankage, and 50 to 70% for low grade animal tankage. It is quite desirable that this availability be increased somewhat before the tankages are placed upon the market.

Cyanamid itself contains a considerable quantity of basic lime, which when mixed with acid phosphate in excess of certain predetermined proportions tends to change the soluble forms of phosphoric acid to insoluble ones. Also cyanamid is a rather finely ground, dusty material, and in compounding with other fertilizers it is found desirable to eliminate this dust as much as possible in the process of compounding, as well as in the later handling and sowing of this material on the soil.

The process which I have here invented is designed to eliminate most of the above difficulties found in processing the above two materials and consists as follows: I take the tankage as obtained from the preliminary drying operation and containing say 15-25% of water to which condition it can easily be prepared through the direct process drier without trouble, and mix it with commercial cyanamid or lime nitrogen. I found that the proportions which yield a very good result are about 100 parts of said damp tankage to about 17 parts of cyanamid or lime nitrogen. The cyanamid or lime nitrogen has the property of fixing the free moisture in the tankage in a stable chemical form and thereby removes the moist and sticky nature of the tankage. I have found that if a mixture, such as the above, is prepared, the resulting product made of 100 parts of 20% moisture tankage and 20 parts of cyanamid or lime nitrogen will show only 10% of moisture after being stored in bulk for two weeks, and if this bulk storage is permitted to last for four weeks, the resulting product will contain only 5 to 7% of free moisture. A quantity of moisture as low as this renders tankage free from objection to moisture content, and it enables it to be mixed without trouble with other fertilizer materials. I find this mixture seems to be chemically fixed and not removed from the mass, for there seems to be practically no diminution in the total weight of the mixed product.

The basic character of the cyanamid neutralizes any free acids which might exist in the tankage, and thereby loses its alkalinity; practically all of these tankages contain amnino acids, which also perform neutralizing of the lime and we, therefore, find that when such cyanamid or lime is mixed with the tankage its alkalinity is much reduced and we can, therefore, mix the tankage-cyanamid product with acid phosphate without any fear of combination of the lime in the cyanamid with the phosphoric acid in the acid phosphate.

Cyanamid contains about 20% of nitrogen, so that this mixture of the high nitrogen content cyanamid with the low nitrogen content tankage yields a product containing a higher percentage of nitrogen than the tankage itself, thereby producing a product of considerably more value than the tankage itself, and at the same time cutting down transportation charges per unit of nitrogen contained.

The nitrogen in cyanamid shows as availability by the ordinary chemical methods of above 90%, naturally when such a material is mixed with a tankage showing an availability of only 60% in the proportions above mentioned, the resulting product will show an availability of 65%, which increase is greatly desired in the final product.

In such a mixture as I have described we also find that the particles of cyanamid become attached to the particles of tankage, thereby largely eliminating the dusting features of the cyanamid and so facilitating its mixture with other fertilizer materials in the compounding of complete fertilizer. We thus see that by the mixing of cyanamid or lime nitrogen with tankage we obtain a product of much lower free moisture content, higher nitrogen content and higher availability than the original tankage, and at the same time we have so altered the cyanamid that it no longer shows any considerable tendency to change soluble phosphates into insoluble phosphates, and we are eliminating the dusting feature entirely from it. The mixture in this way is of more value than either of the two materials separately for the compounding of complete fertilizers, and possesses none of the possible disadvantages of the individual constituents.

What I claim is:

1. The process of completing the drying of a tankage fertilizer material, while at the same time increasing its nitrogen content and fixing a portion of its contained moisture, which consists in intimately mixing commercial calcium cyanamid, or lime nitrogen, in predetermined proportions to said material, substantially as described.

2. The herein described dust free fertilizer consisting of dried tankage material containing phosphoric material and fixed moisture, and sufficient crude cyanamid to have fixed said moisture, substantially as de-described.

In testimony whereof I affix my signature, in presence of two witnesses.

FRANK S. WASHBURN.

Witnesses:
G. U. SCHUMAN,
A. D. WHITTEMORE.